(12) United States Patent
Kondo et al.

(10) Patent No.: US 7,431,577 B2
(45) Date of Patent: Oct. 7, 2008

(54) DIE AND METHOD FOR MANUFACTURING CORE

(75) Inventors: Yoichiro Kondo, Tokyo (JP); Hiroyuki Isoi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 84 days.

(21) Appl. No.: 10/599,739

(22) PCT Filed: Mar. 29, 2005

(86) PCT No.: PCT/JP2005/005792

§ 371 (c)(1),
(2), (4) Date: Oct. 6, 2006

(87) PCT Pub. No.: WO2005/097455

PCT Pub. Date: Oct. 20, 2005

(65) Prior Publication Data

US 2007/0193327 A1 Aug. 23, 2007

(30) Foreign Application Priority Data

Apr. 6, 2004 (JP) .............................. 2004-111784

(51) Int. Cl.
  *B29C 45/02* (2006.01)
  *B29C 45/14* (2006.01)
(52) U.S. Cl. ...................... 425/120; 425/121; 425/128; 425/129.1; 425/324.1
(58) Field of Classification Search ................. 425/120, 425/121, 128, 129.1, 324.1
See application file for complete search history.

(56) References Cited

U.S. PATENT DOCUMENTS 2,914,800 A * 12/1959 Morin .......................... 425/121

4,362,490 A * 12/1982 Machida et al. ............. 425/121

FOREIGN PATENT DOCUMENTS

DE  101 61 365 A1  6/2003
DE  102 08 613 C1  6/2003

(Continued)

OTHER PUBLICATIONS

European Search Report dated May 28, 2008.

*Primary Examiner*—James Mackey
(74) *Attorney, Agent, or Firm*—Sughrue Mion, PLLC (57) ABSTRACT

An object of the present invention is to provide a die and a method for manufacturing a core, wherein the core includes a ring-shaped supporting member 16 that is formed by a plate-like member, that is disposed inside a pneumatic tire, and that supports a pneumatic tire by allowing an inner side of a tread portion of the pneumatic tire to be brought into contact with an outer peripheral surface of the supporting member at the time of a deformation of the pneumatic tire due to a decrease of an internal pressure of the tire, and ring-shaped rubber portions that are joined respectively to both widthwise direction edge portions of the supporting member. A pressing machine 10 includes a ring-shaped core die 26 that is brought into contact with the supporting member 16 from a radial direction inner side thereof to support the supporting member 16 while maintaining a non-contact state with the both widthwise direction edge portions of the supporting member 16, and an upper intermediate die 28 and a lower intermediate die 30 that are disposed so as to hold the core die 26 therebetween from a widthwise direction of the core die 26 and that form cavities 42A and 42B for the rubber portions between the upper intermediate die 28 and the core die 26 as well as between the lower intermediate die 30 and the core die 26. The rubber material G contained in the pod portions 46A1, 46A2, 46B1 and 46B2 formed at the dies 28 and 30 are transferred from runners 44A1, 44A2, 44B1 and 44B2 into cavities 42A and 42B.

6 Claims, 11 Drawing Sheets

FOREIGN PATENT DOCUMENTS

| | | |
|---|---|---|
| DE | 103 34 438 A1 | 2/2005 |
| JP | 48-21765 A | 3/1973 |
| JP | 62-32038 A | 2/1987 |
| JP | 62-68711 A | 3/1987 |
| JP | 62-240519 A | 10/1987 |
| JP | 4-267117 A | 9/1992 |
| JP | 6-312432 A | 11/1994 |
| JP | 2004-1022 A | 1/2004 |
| JP | 2004-189214 A | 7/2004 |
| WO | 2005/014310 A1 | 2/2005 |

* cited by examiner

DIE AND METHOD FOR MANUFACTURING CORE

TECHNICAL FIELD

The present invention relates to a die and a method for manufacturing a core which is disposed inside a pneumatic tire.

BACKGROUND ART

For a run flat traveling of a vehicle at the emergent situation such as a puncture or the like, it is useful to equip at the inside of the pneumatic tire with a core attached to a rim.

The core comprises a ring-shaped supporting member (metal annular body, sometimes, "shell") which is generally formed of a plate-like member and which supports the pneumatic tire by allowing the inside of a tread portion of the tire to be brought into contact with an outer peripheral surface of the supporting member at the time of the pneumatic tire deformation due to an internal pressure decrease of the tire, and ring-shaped rubber portions which are vulcanized and joined respectively to both edge portions in a widthwise direction (hereinafter, "both widthwise direction edge portions") of the supporting member. When such a core is manufactured as a product, after manufacturing the supporting member in advance, the supporting member and the rubber portions are joined to each other by using a dye.

For example, there are four manufacturing examples: Manufacturing Example 1 (bladder vulcanizing method): pre-molded unvulcanized rubber members are disposed at the both widthwise direction edge portions of the supporting member, the unvulcanized rubber members and the supporting member are set in a die, pressurized from the inner surface side of the supporting member with the bladder, further heated, and vulcanized to manufacture a product.

Figure 9A:
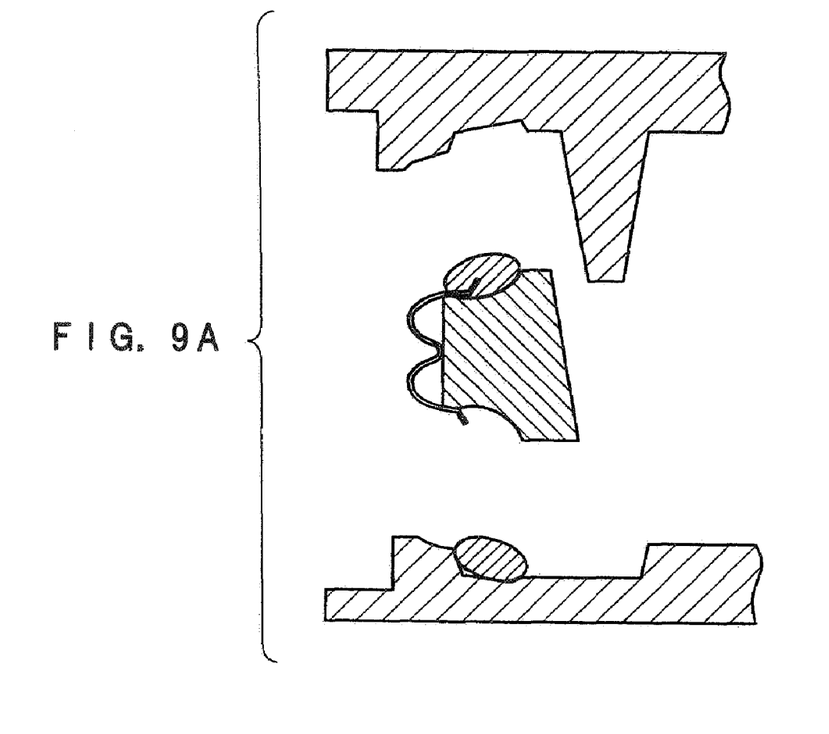
FIG. 9A is a partial side cross-sectional view of a conventional method for manufacturing a core in which rubber portions are simultaneously compression-molded in a vertical direction.
Figure 9B:
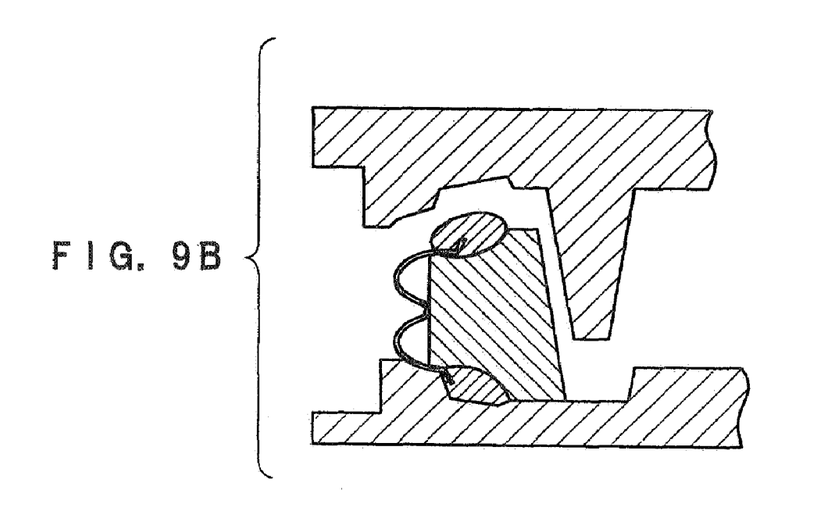
FIG. 9B is a partial side cross-sectional view of the conventional method for manufacturing a core in which the rubber portions are simultaneously compression-molded in a vertical direction.

Manufacturing Example 2 (compression molding and vulcanizing method): pressurization technology described in Japanese Patent Application (Laid-Open) No. 48-021765 is utilized in which the supporting member is set in a compression molding die, and the widthwise direction side portions of the supporting member are compression-molded simultaneously, and vulcanized to manufacture a product (see FIG. 9).

Manufacturing Example 3 (injection molding and vulcanizing method): injection technology described in JP-A No. 62-032038 is utilized in which the supporting member is set in an injection molding die. Rubbers are injection-molded sequentially at both edge portions of the supporting member, and then vulcanized to manufacture a product.

Manufacturing Example 4 (transfer molding and vulcanizing method): transfer technology described in JP-A Nos. 62-240519 and 04-267117 is utilized in which the supporting member is set in a transfer molding die. Rubbers are injection-molded sequentially at both edge portions of the supporting member, and then vulcanized to manufacture a product.

However, there have been arisen the problems as described below:

In the bladder vulcanizing method, an adhesive is applied onto the surface of the supporting member for a purpose of a joint between the supporting member and the rubber portions thus adherence between the bladder and the supporting member may occur. For this reason, the bladder is noticeably deteriorated making it necessary to replace the bladder with every completion of about 10 products' processing.

In the compression molding and vulcanizing method, when the supporting member is simultaneously compressed in a vertical direction by using a lower die and an upper die, rubber material must be preset at the lower die. For this reason, grooves to be inserted into the rubber material must be preformed at the supporting member or the rubber material must be divided into two members thus requiring for another step for presetting. At this point, the presetting becomes unnecessary by raising a core portion for supporting the supporting member and by setting the rubber material beneath the supporting member. In this case, however, the supporting member may deform or the product size may change.

In the injection molding and vulcanizing method, because the both edge portions of the supporting member are molded sequentially, vulcanization molding must be performed twice thus leading to a prolonged manufacturing time for one product resulting in less productivity. Further, a rubber extruder becomes necessary. Therefore, in order to simultaneously mold the rubber portions at the both widthwise direction edge portions of the supporting member, the equipment or the die becomes complicated resulting in a boost of the equipment cost, which is not preferable.

Being different from the injection molding and vulcanizing method, in the transfer molding and vulcanizing method, the extruder is unnecessary. However, since the both edge portions of the supporting member are molded sequentially thus leading to a prolonged manufacturing time for one product resulting in less productivity.

DISCLOSURE OF THE INVENTION

Problems to be Solved by the Invention

In view of the aforementioned facts, an object of the invention is to provide a die and a method for manufacturing a core which are capable of manufacturing cores continuously with high accuracy and with high productivity by using simple and low-cost equipment.

MEANS FOR SOLVING THE SUBJECTS

The present inventors has been studying how to mold rubber members simultaneously at the both widthwise direction edge portions of the supporting member by using a transfer molding and a vulcanizing method which do not require an extruder. However, in a conventional technique, a die which is able to mold rubber members simultaneously at the both widthwise direction edge portions of the supporting member has not yet been developed.

Accordingly, the present inventors intensively studied, and developed a die which is able to mold rubber members simultaneously at the both widthwise direction edge portions of the supporting member by using the transfer molding and the vulcanizing method, and completed the present invention.

An invention according to claim 1 is a die for manufacturing a core, wherein the core includes a ring-shaped supporting member which is formed by a plate-like member, which is disposed inside a pneumatic tire, and which supports the pneumatic tire by allowing an inner side of a tire tread portion to be brought into contact with an outer peripheral surface of the supporting member at the time of the pneumatic tire deformation due to an internal pressure decrease of the tire, and ring-shaped rubber portions that are respectively joined to both widthwise direction edge portions of the supporting member, wherein the die comprises a ring-shaped core die which is brought into contact with the supporting member from radial inner side directions thereof to support the supporting member while maintaining non-contact state with the both widthwise direction edge portions of the supporting member, first and second transfer-molding dies that are disposed so as to hold the core die therebetween from the core axial direction and form cavities between the first transfer-molding die and the core die as well as between the second transfer-molding die and the core die, the cavities being used for forming the rubber portions respectively at one edge portion and the other edge portion of the supporting member, and a transfer part which injects the rubber material into runners which are formed respectively at the first and second transfer-molding dies and simultaneously transfers the rubber material into the cavities, whereby the rubber material injected into the cavities are vulcanized and molded.

In order to manufacture a core by using the die for manufacturing a core according to claim 1, the supporting member is formed in advance to allow the core die to support the supporting member. In this supporting state, the both widthwise direction edge portions of the supporting member are not brought into contact with the core die.

In this state, when the first and second transfer-molding dies are closed, the aforementioned cavities are formed respectively at the peripheries of the both widthwise direction edge portions of the supporting member.

Then, the rubber material is simultaneously injected by the transfer part into runners which are formed respectively at the first and second transfer-molding dies, so that the rubber material is simultaneously transferred into the cavities.

Then, due to vulcanization molding of the rubber members, a core with the ring-shaped rubber portions joined to the both widthwise direction edge portions of the supporting member is manufactured.

Thus, in the invention according to claim 1, the rubber material is transferred simultaneously from the runners of the first and the second transfer-molding dies, and then vulcanized and molded. Accordingly, the die for manufacturing a core is implemented which can manufacture cores continuously with high accuracy and with high productivity by using simple and low-cost equipment.

The invention according to claim 2 is the die for manufacturing a core, wherein the dimensions of the respective runners of the first and second transfer-molding dies are the same.

Accordingly, equalization of the injection amount and injection speed of the rubber material and the rubber properties is noticeably facilitated.

The invention according to claim 3 is the die for manufacturing a core, wherein the transfer part comprises pod portions which are provided for the respective runners and connected thereto, with the upper portions of the pod portions are concaved for receiving the rubber material, and convex portions which are provided at the upper side to each of the pod portions to cause transfer of the rubber material by entering each of the pod portions.

Accordingly, displacement or biting of the rubber material (raw rubber) can be prevented, so that setting of the rubber material is facilitated. This effect can be noticeably exhibited particularly when the first and second transfer-molding dies are disposed so as to open/close in a vertical direction.

The invention according to claim 4 is the die for manufacturing a core, wherein a heat source is provided at the first and at the second transfer-molding dies.

Therefore, a decrease of the temperature of a die due to the radiation at the full open time of the die can be prevented. Accordingly, the quality of the rubber properties of the product manufactured by the vulcanization molding can be secured, and opening/closing operation malfunction due to a difference between the thermal expansion coefficients of the dies can be prevented.

The invention according to claim 5 is the die for manufacturing a core, wherein, due to an application of a compression force in a widthwise direction to the supporting member, the width of the supporting member is made smaller in the closed state of the first and second transfer-molding dies than in the open state thereof.

Accordingly, variation of the manufactured supporting member can be compensated, so that reliable setting of the supporting member within the die is facilitated. Further, when the dies are opened, the product can be easily peeled off from the portion of the supporting member being brought into contact with the die.

The invention according to claim 6 is a die for manufacturing a core including a ring-shaped supporting member that is formed by a plate-like member, which is disposed inside a pneumatic tire, and that supports the pneumatic tire by allowing an inner side of a tire tread portion to be brought into contact with an outer peripheral surface of the supporting member at the time of the pneumatic tire deformation due to an internal pressure decrease of the tire; and ring-shaped rubber portions which are respectively joined to both widthwise direction edge portions of the supporting member, the die comprising a ring-shaped core die that is brought into contact with the supporting member from radial inner side directions thereof to support the supporting member while maintaining a non-contact state with the both widthwise direction edge portions of the supporting member, a transfer-molding die and a compression-molding die which are disposed so as to hold the core die therebetween from the core die axial direction, and that form cavities between the transfer-molding die and the core die as well as between the compression-molding dies and the core die, the cavities being used for forming the rubber portions respectively at one edge portion and at the other edge portion of the supporting member, a transfer part that, at the same time when a rubber material is compressed by the compression molding die, causes a rubber material to be injected into runners formed at the transfer-molding die and transferred into the cavities, wherein the rubber material injected into the cavities is vulcanized and molded.

In order to manufacture a core by using the die for manufacturing a core according to claim 6, the supporting member is formed in advance to cause the core die to support the supporting member. In this supporting state, the both widthwise direction edge portions of the supporting member are not brought into contact with the core die. Then, the rubber material to be compression-molded by the compression part is disposed at predetermined positions.

In this state, when the transfer-molding die and the compression-molding die are closed, the aforementioned cavities are formed respectively at the peripheries of the both widthwise direction edge portions of the supporting member.

At the same time when the rubber material is compression-molded by the compression molding die, the rubber material is injected by one side transfer part into the runners formed at the transfer molding die, and then transferred into the cavities, and molded.

Due to the vulcanization molding, a core with the ring-shaped rubber portions joined to the both widthwise direction edge portions of the supporting member is manufactured.

In this way, in the invention according to claim 6, at the same time when the rubber material is compressed by the compression-molding die, the rubber material is transferred from the runners of the transfer-molding die, and vulcanized and molded. As a result, the die for manufacturing a core is implemented which can manufacture cores continuously with high accuracy and with high productivity by using simple and low-cost equipment.

The invention according to claim 7 is the die for manufacturing a core, wherein a heat source is provided at the transfer-molding die and at the compression-molding die.

Therefore, the decrease of the temperature of the die due to radiation at the full-open time of the die can be prevented. Accordingly, the quality of the rubber properties of the product which is manufactured by the vulcanization molding can be secured, and opening/closing operation malfunction due to a difference between thermal expansion coefficients of the dies can be prevented.

The invention according to claim 8 is the die for manufacturing a core, wherein, due to an application of a compression force in a widthwise direction to the supporting member, the width of the supporting member is made smaller in the closed state of the transfer-molding die and the compression-molding die than in the open state thereof.

Accordingly, variation of the manufactured supporting member can be compensated, so that reliable setting of the supporting member within the die is facilitated. Further, when the dies are opened, the product can be easily peeled off from the portion of the supporting member being brought into contact with the die.

The invention according to claim 9 is the core manufacturing die, wherein the diameter of the core die can be varied to be increased and decreased.

Therefore, when the dies are opened, by moving the portions of the dies being brought into contact with the support member toward the central axis of the supporting member, setting of the supporting member or removal of the product (core) manufactured by the vulcanization molding is facilitated. Further, the invention may have a structure of providing the die with a bracing part for holding the supporting member therein. Accordingly, occurrences of rattling during the molding can be prevented thereby avoiding spew of rubbers and making trimming operation unnecessary.

The invention according to claim 10 is a method for manufacturing a core including a ring-shaped supporting member that is formed by a plate-like member, that is disposed inside a pneumatic tire, and that supports the pneumatic tire by allowing an inner side of a tire tread portion to be brought into contact with an outer peripheral surface of the supporting member at the time of a deformation of the pneumatic tire due to a decrease of an internal pressure of the tire; and ring-shaped rubber portions which are respectively joined to both widthwise direction edge portions of the supporting member, the method comprising, setting the supporting member in the die, and vulcanizing and molding by compression-molding from the side of one widthwise edge portion of the supporting member and at the same time transfer molding from the other widthwise edge portion of the supporting member.

Therefore, as compared to a case in which a rubber material is injection-molded from the both widthwise direction sides of the supporting member and vulcanized or a case in which the rubber material is transfer-molded from the both widthwise direction sides of the supporting member and vulcanized, an amount of structural members of the runners is reduced by half thus resulting in a reduction of the number of steps for cleaning dies or the number of finishing steps of products by half.

The invention according to claim 11 is a method for manufacturing a core, comprising, when setting the supporting member horizontal in the die, and when vulcanizing and molding, the side from which compression-molding is carried on the one widthwise edge portion of the support member is the upper side thereof.

Accordingly, presetting of the rubber material to be compression-molded becomes unnecessary, so that a core manufacturing time can be reduced to a great deal.

EFFECTS OF THE INVENTION

The present invention structured as described above provides an excellent effect that cores can be manufactured continuously with high accuracy and with high productivity by using simple and low-cost equipment.

BEST MODE FOR CARRYING OUT THE INVENTION

Embodiments of the present invention will be explained hereinafter.

First Embodiment

Figure 1:
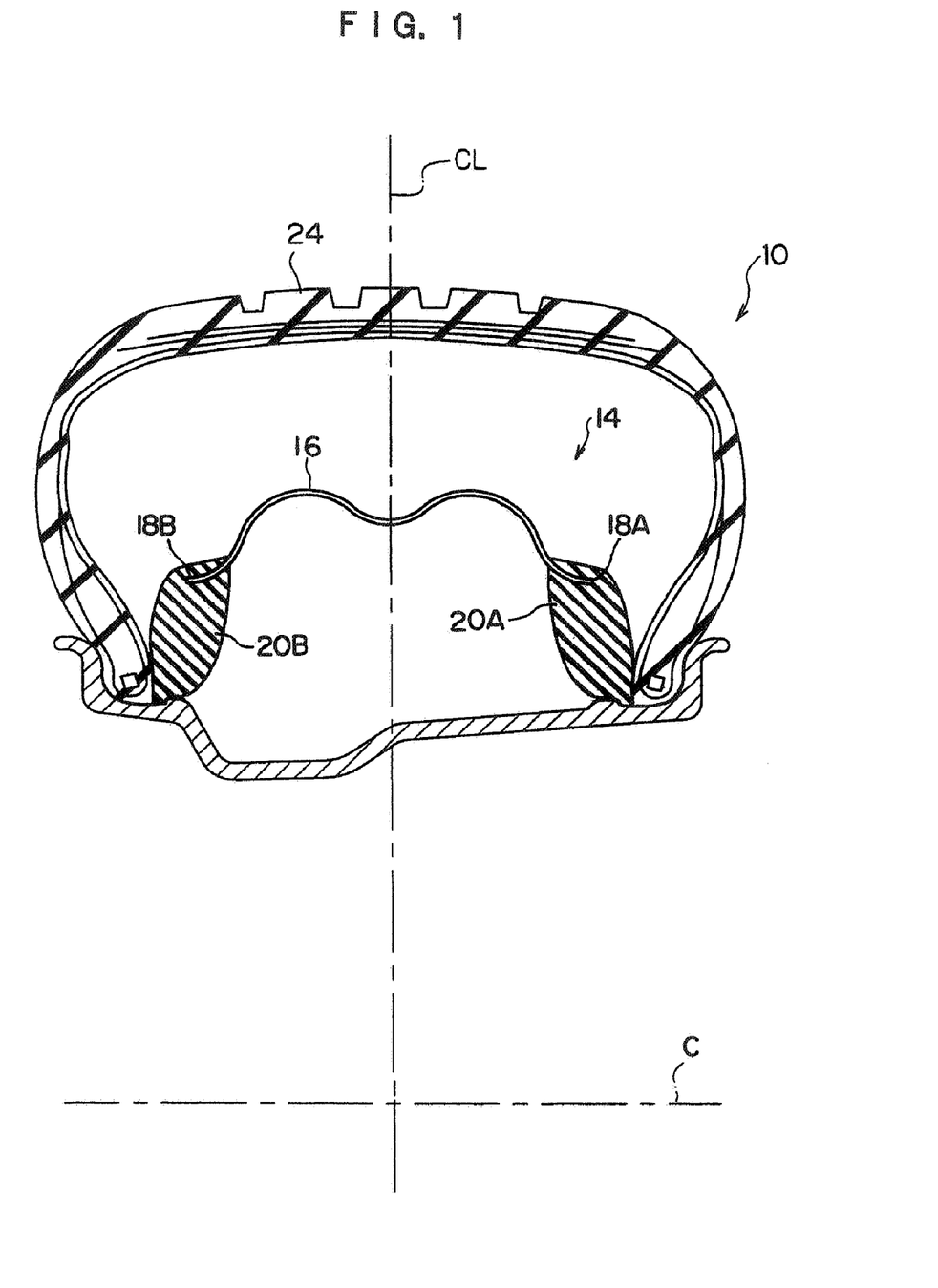
FIG. 1 is a tire widthwise direction cross-sectional view illustrating a state in which a core that is manufactured according to a first embodiment is provided inside a pneumatic tire.
Figure 2:
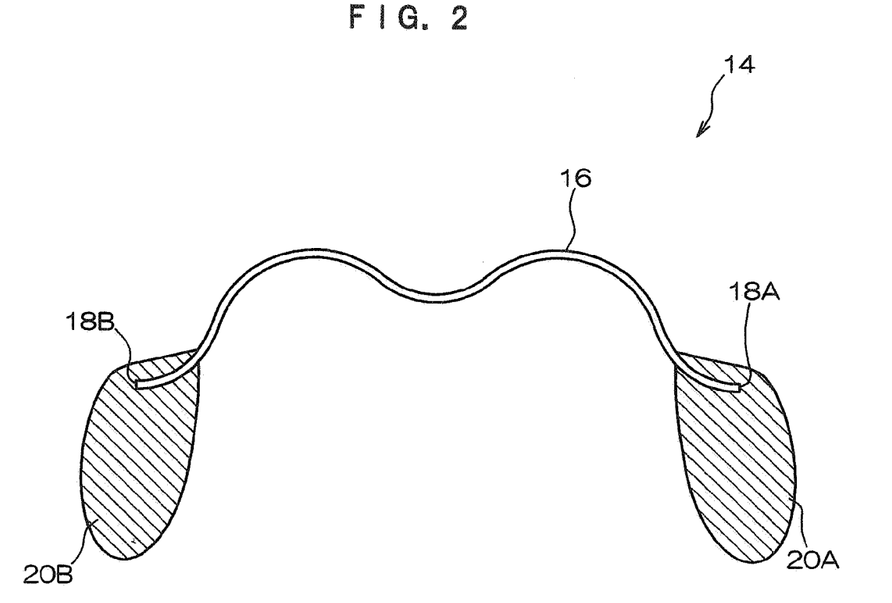
FIG. 2 is a core widthwise direction cross-sectional view illustrating the core that is manufactured in the first embodiment.

A first embodiment will be explained. In the first embodiment, a core 14 (see FIG. 2) disposed inside a pneumatic tire 10 (see FIG. 1) is manufactured by using a pressing machine 12 (see FIG. 3) by which vulcanization molding is enabled. The core 14 comprises a ring-shaped supporting member 16 which is formed by a plate-like member, and ring-shaped rubber portions (elastomer portions) 20A and 20B which are vulcanized and joined respectively to both widthwise direction edge portions 18A and 18B of the supporting member 16. Since the pneumatic tire 10 is provided with the core 14, even when the pneumatic tire 10 is deformed due to a puncture or the like, the pneumatic tire 10 is supported by the inner side of a tread portion 24 being brought into contact with the outer peripheral surface of the supporting member 16. Accordingly, run-flat traveling is enabled.

Figure 3A:
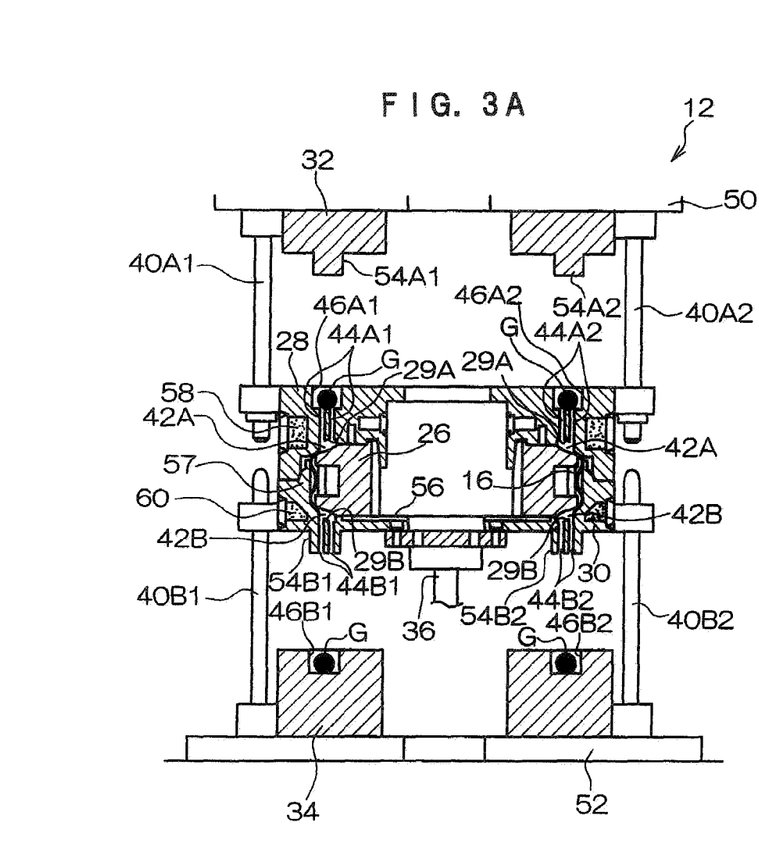
FIG. 3A is a side cross-sectional view showing a state before rubber material is transferred in a pressing machine according to the first embodiment.
Figure 3B:
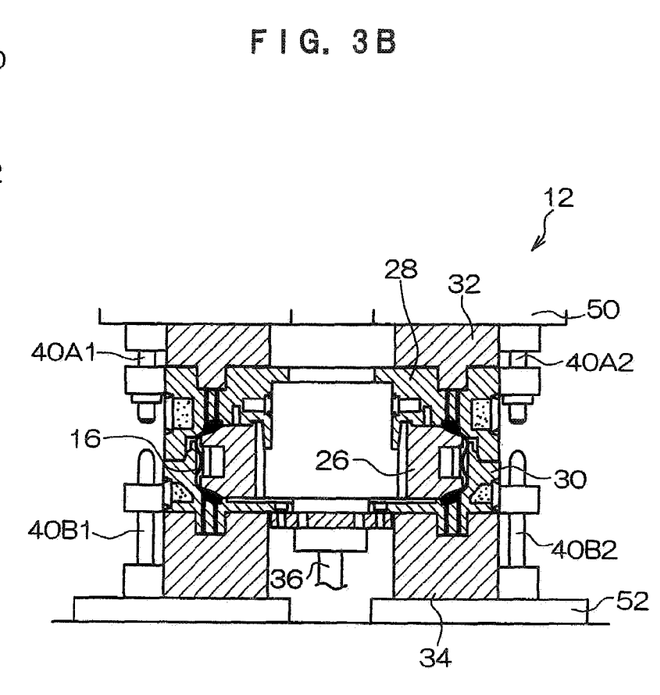
FIG. 3B is a side cross-sectional view showing a state after the rubber material is transferred in the pressing machine according to the first embodiment.

As shown in FIG. 3, the pressing machine 12 includes a ring-shaped core die 26 which supports the supporting member 16 from radial direction inner sides of the supporting member 16 while the core die 26 is in the non-contact state with both edge portions 18A and 18B of the supporting member. Further, the pressing machine 12 includes an upper intermediate die 28 and a lower intermediate die 30 which are provided movably upward/downward to form a pair of dies, while holding the core die 26 therebetween in an axial direction. Further, the pressing machine 12 includes an upper die 32 which is disposed above the upper intermediate die 28 to transfer a rubber material and a lower die 34 which is disposed below the lower intermediate die 30 to transfer a rubber material.

The upper intermediate die 28 is disposed above the core die 26, and the lower intermediate die 30 is disposed below the core die 26, respectively. The lower intermediate die 30 is able to ascend/descent by a lifting cylinder 36. Further, the upper die 32, the upper intermediate die 28, the lower intermediate die 30, and the lower die 34 are aligned with each other by shafts 40A1, 40A2, 40B1 and 40B2. The upper intermediate die 28 and the lower intermediate die 30 carry out opening/closing operations so as to hold the core die 26 therebetween in the vertical direction.

The upper intermediate die 28 includes a wall surface portion 29A that forms cavities 42A for forming the rubber portion 20A in a clearance made between the core die 26 and the wall surface portion 29A. The lower intermediate die 30 includes a wall surface portion 29B which forms cavities 42B for forming the rubber portion 20B in a clearance made between the core die 26 and the wall surface portion 29B.

Runners 44A1 and 44A2 connected to the cavities 42A are formed at the upper intermediate die 28. With similar to this, runners 44B1 and 44B2 connected to the cavities 42B are formed at the lower intermediate die 30. The size and the number of the runners 44A1, 44A2, 44B1 and 44B2 are the same.

Pod portions 46A1 and 46A2 for containing therein the rubber material which is transferred into the cavities are formed at the upper intermediate die 28. The dimensions of the pod portions 46A1 and 46A2 are the same, and upper portions thereof are recessed for containing therein the rubber material by the rubber material being simply inserted into the pod portions 46A1 and 46A2.

The upper die 32 and the lower die 34 are fixed respectively to a top panel 50 and a bottom panel 52 for structuring the pressing machine 12. Further, both of the aforementioned shafts 40A1 and 40A2 are fixed to the top panel 50 so as to be movable up and down, while both of the shafts 40B1 and 40B2 are fixed to the bottom panel 52 so as to be movable up and down.

In accordance with the dimensions of the pod portions 46A1 and 46A2, convex portions 54A1 and 54A2 are formed at the upper die 32. When the upper die 32 is laid on the upper intermediate die 28, the convex portions 54A1 and 54A2 are inserted into the pod portions 46A1 and 46A2, respectively, so that the rubber material in the pod portions 46A1 and 46A2 are extruded to the runners 44A1 and 44A2 and transferred into the cavities.

Pod portions 46B1 and 46B2, each having the same size as the pod portion 46A1 (in other words, as the pod portion 46A2), are formed at the lower die 34. The portions of the pod portions 46B1 and 46B2 are concaved in the same manner as the pod portions 46A1 and 46A2 to contain therein the rubber material merely by inserting the rubber material into the pod portions 46B1 and 4B2.

Convex portions 54B1 and 54B2 are formed at the lower intermediate die 30 in accordance with the dimensions of the pod portions 46B1 and 46B2. The runners 44B1 and 44B2 are respectively penetrated through the convex portions 54B1 and 54B2. Further, when the lower intermediate die 30 is laid on the lower die 34, the convex portions 54B1 and 54B2 are respectively inserted into the pod portions 46A1 and 46A2, and the rubber material in the pod portions 46B1 and 46B2 is extruded to the runners 44B1 and 44B2 and transferred into the cavities.

A mount portion 56, on which the respective members for structuring the core die 26 can be slidably mounted and to which the respective members are fixed at predetermined positions, is formed at the lower intermediate die 30. Further, a ring-shaped outer contact portion 57, which is brought into contact with the supporting member 16 from the radial direction outer side thereof to support the supporting member 16, is provided at the lower intermediate die 30. The contact surface of the outer side contact portion 57 is formed into a substantially short cylindrical inner surface so that the supporting member 16 can be set or the core 14 can be removed. Accordingly, the supporting member 16 can be held between the outer contact portion 57 and the core die 26.

Jackets (heaters) 58 and 60 are provided at the upper intermediate die 28 and the lower intermediate die 30, respectively, thus making it possible to shorten the time for correction of the temperature of the die due to radiation when the dies are opened. Further, the wall surface portion 29A and the wall surface portion 29B are formed into predetermined configurations such that a compression force in a widthwise direction is applied to the supporting member 16 and the width of the supporting member 16 is made smaller in the closed state of the dies 28 and 30 than in the open state thereof.

In order to prevent the dies from being closed in the state in which they displace from each other, engagement portions that engage with the upper intermediate die 28 and the lower intermediate die 30 may be provided.

As shown in FIGS. 4A, 4B, 5C and 5D, the diameter of the core die 26 can be increased/decreased by disassembling/assembling the core die 26. In the state in which the diameter of the core die 26 is increased (see FIGS. 4 and 6B), the core die 26 is brought into contact with the inner side of the supporting member 16.

The core die 26 is divided into 16 portions, and formed of 8 (eight) large piece portions 62, and 8 (eight) small piece portions 64 going in/out between the large piece portions 62 disposed adjacent to each other. Each of the small piece portions 64 is configured so as to have a width which becomes eventually smaller as apart from the central axis C of the core die 26.

(Operation)

Hereinafter, a description will be made of an operation for manufacturing the core 14 in which the rubber portions 20A and 20B are joined to the supporting member 16 by a vulcanization molding.

Figure 6A:
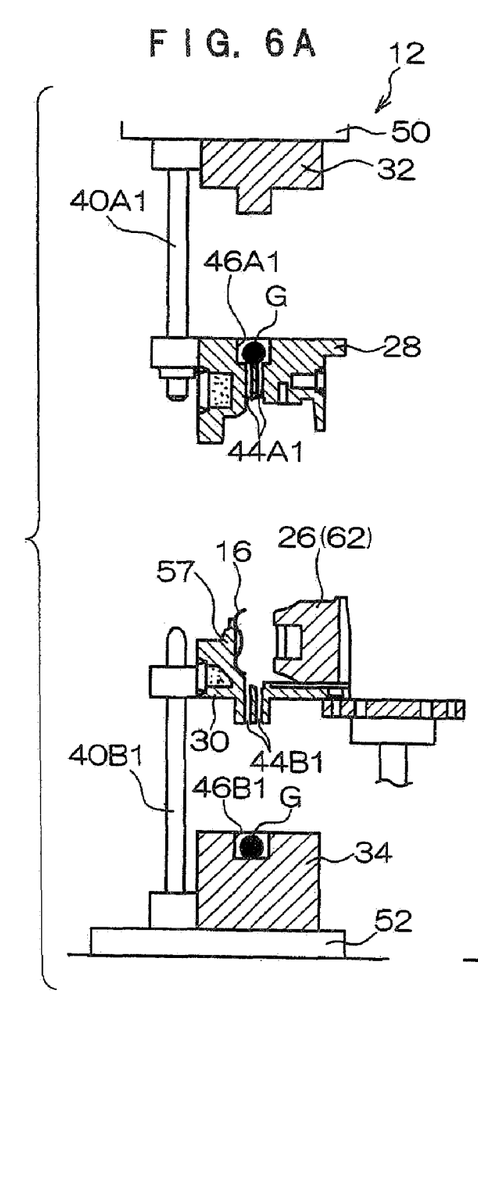
FIG. 6A is a side cross-sectional view of a procedure according to the first embodiment in which a supporting member is set and rubber portions are vulcanizingly molded.

First, as shown in FIG. 6A, the upper die 32, the upper intermediate die 28, the lower intermediate die 30, and the lower die 34 are separated from each other to form a state in which the diameter of the core die 26 is decreased. In this state, the supporting member 16 is inserted into the outer side contact portion 57 from above and disposed at a set position.

Further, the rubber materials (raw rubber) G in the same amount are contained in the respective pod portions 46A1 and 46A2. The amount of the rubber material is determined so as to be injected into the cavities in an amount required for molding the rubber portion 20A, while considering the volumes of the runners 44A1 and 44A2. With similar to this, the rubber material G in the same amount as described above is contained in the pod portions 46B1 and 46B2.

Figure 6B:
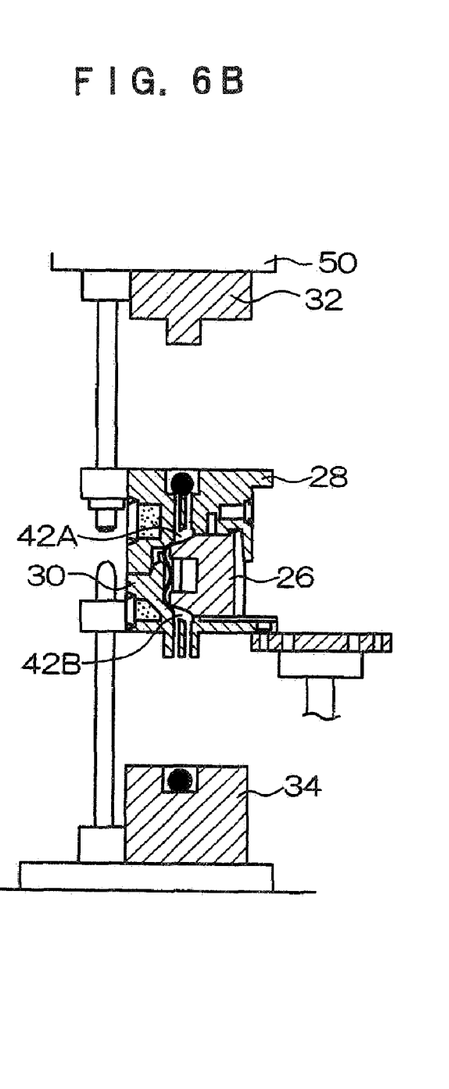
FIG. 6B is a side cross-sectional view of the procedure according to the first embodiment in which the supporting member is set and the rubber portions are vulcanizingly molded.

In this state, the diameter of the core mold 26 is increased to be brought into contact with the supporting member 16 from the inside thereof to securely position the core die 26 (see FIG. 6B). As a result, the supporting member 16 is held between the lower intermediate die 30 and the core die 26, and the cavity 42B is formed at the periphery of the edge portion 18B of the supporting member 16.

Thereafter, by moving the upper panel 50 downward, the upper intermediate die 28 is moved downward and set in a state in which it is closed with respect to the core die 26 (see FIG. 6B). As a result, the cavity 42A is formed at the periphery of the supporting member 16.

Figure 6C:
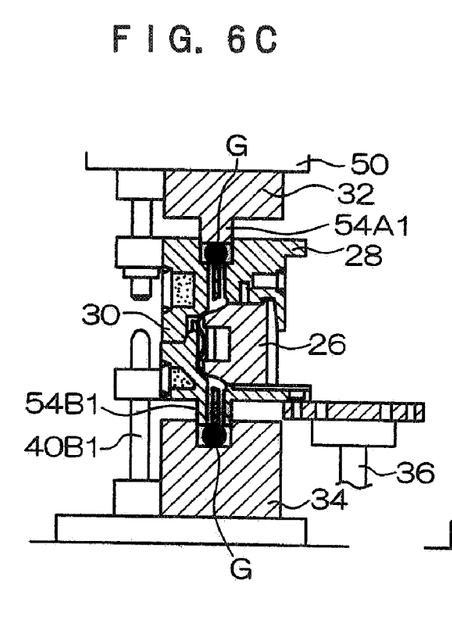
FIG. 6C is a side cross-sectional view of the procedure according to the first embodiment in which the supporting member is set and the rubber portions are vulcanizingly molded.

Further, by moving the lifting cylinder 36 downward, the upper panel 50 and the lower intermediate die 30 are moved downward by the same distance and stopped at predetermined heights. The heights at which the upper panel 50 and the lower intermediate die 30 are stopped correspond to those directly before the rubber material G contained in the pod portions 46A1 and 46A2 are extruded by the convex portions 54A1 and 54A2, and those directly before the rubber material G contained in the pod portions 46B1 and 46B2 are extruded by the convex portions 54B1 and 54B2 (see FIG. 6C).

Figure 6D:
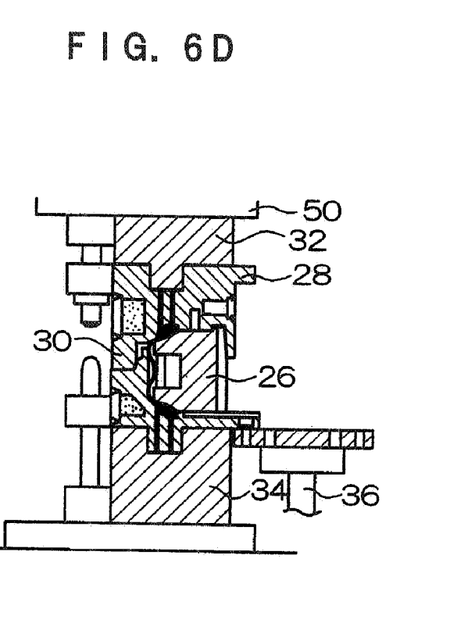
FIG. 6D is a side cross-sectional view of the procedure according to the first embodiment in which the supporting member is set and the rubber portions are vulcanizingly molded.

From this state, by simultaneously moving the upper die 32, the upper intermediate die 28 and the lower intermediate die 30 downward, the rubber material G is simultaneously pressed by the convex portions 54A1, 54A2, 54B1 and 54B2, and passed through the respective runners, and transferred into cavities (see FIG. 6D). In this state, the rubber material G is vulcanized and molded for a predetermined period of time and at a predetermined temperature.

Figure 7E:
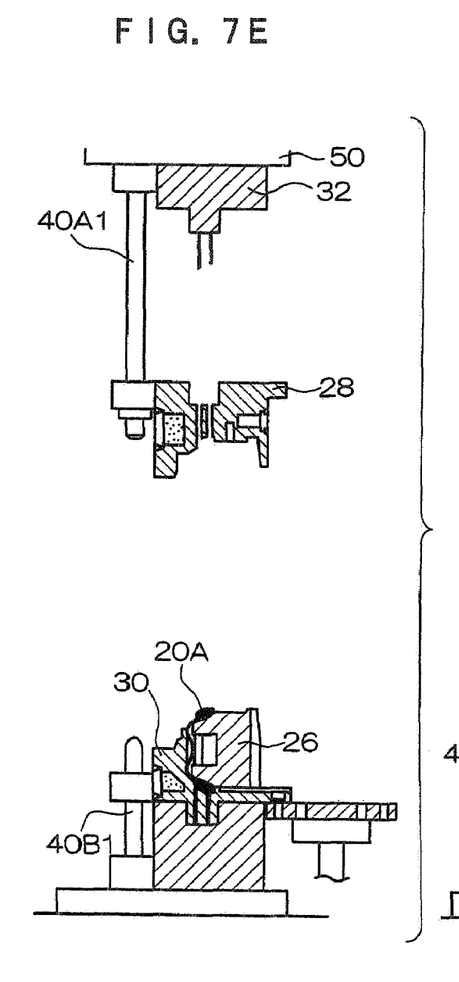
FIG. 7E is a side cross-sectional view of a procedure according to the first embodiment in which the core manufactured by the vulcanization molding is removed, 7E showing a procedure subsequent to that of FIG. 6D.

After a predetermined period of time passed, by moving the upper panel 50 upward, the upper intermediate die 28 is separated from the core die 26 and the lower intermediate die 30, and by extending the shafts 40A1 and 40A2, the upper die 32 and the upper intermediate die 28 are separated from each other (see FIG. 7E).

Figure 7F:
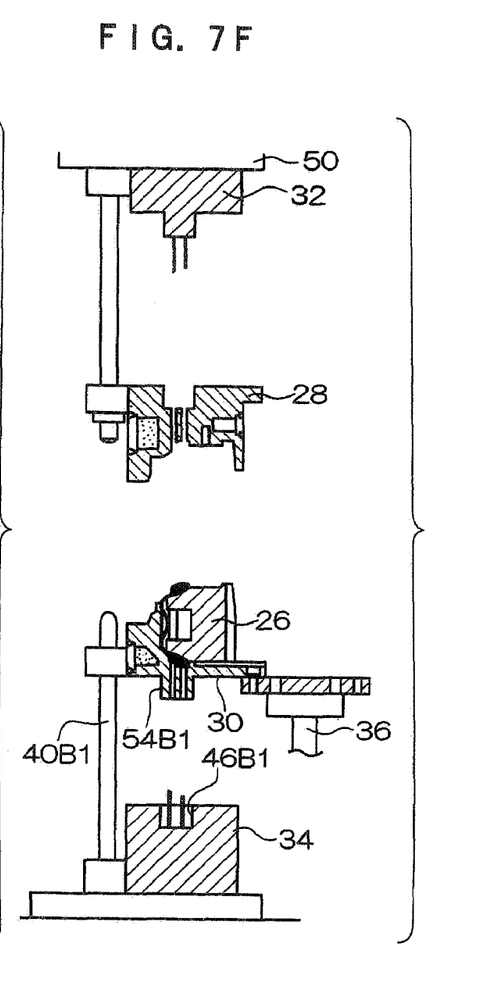
FIG. 7F is a side cross-sectional view of the procedure according to the first embodiment in which the core manufactured by the vulcanization molding is removed.

Further, by moving the lower intermediate die 30 upward, the lower intermediate die 30 is separated from the lower die 34 (see FIG. 7F).

Figure 4A:
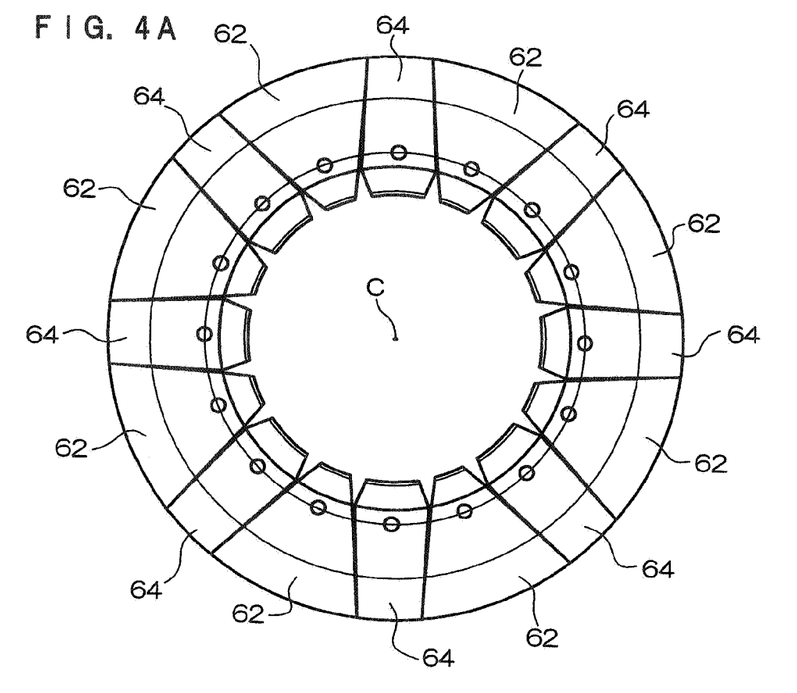
FIG. 4A is a plan view showing a state in which a core die for structuring the pressing machine according to the first embodiment is extended in a radial direction.
Figure 4B:
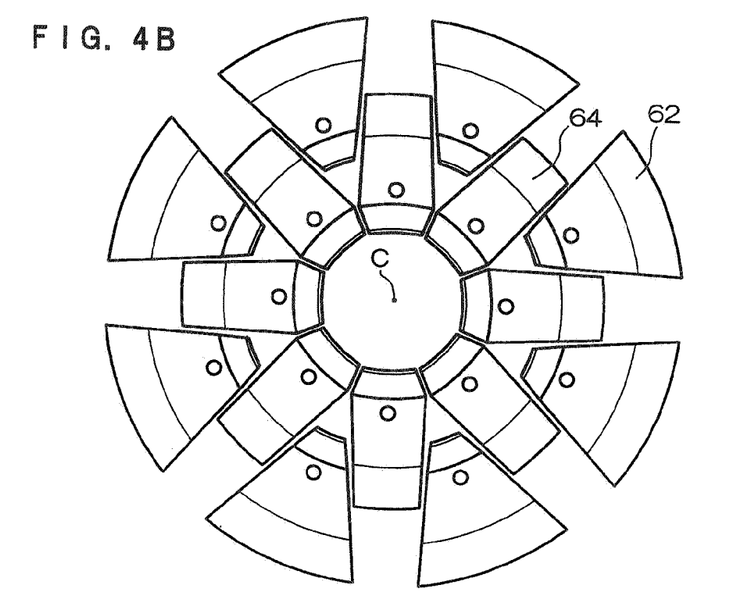
FIG. 4B is a plan view showing a state in which small piece portions of the core die for structuring the pressing machine according to the first embodiment are moved toward the central axis.

Moreover, by moving the small piece portions 64 of the core die 26 toward the central axis C, and the small piece portions 64 are separated from the supporting member 16 (see FIG. 4B). As a result, only the large piece portions 62 are brought into contact with the supporting member 16 (see FIG. 5C).

Figure 5C:
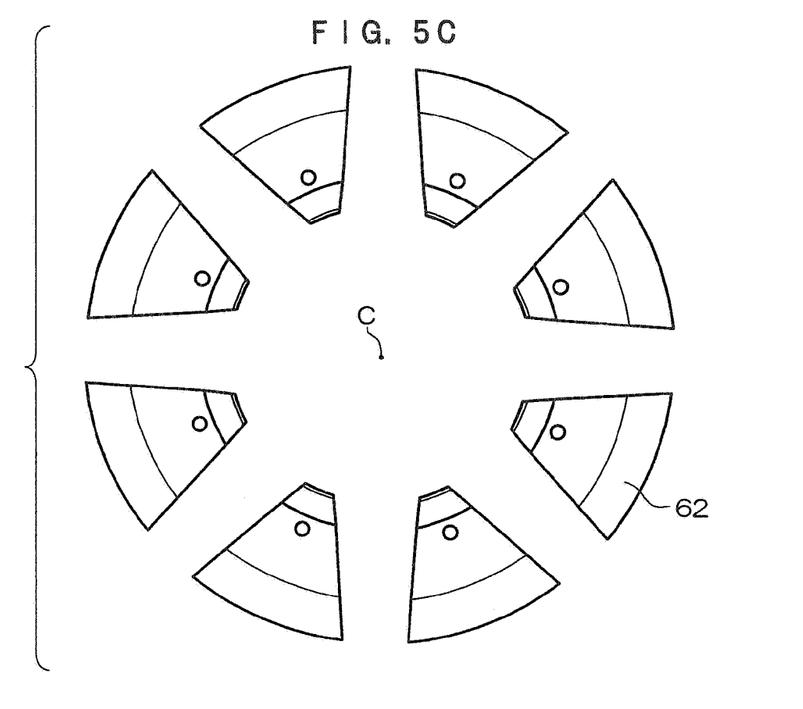
FIG. 5C is a plan view illustrating a state according to the first embodiment in which the small piece portions are removed from the state shown in FIG. 4B.
Figure 5D:
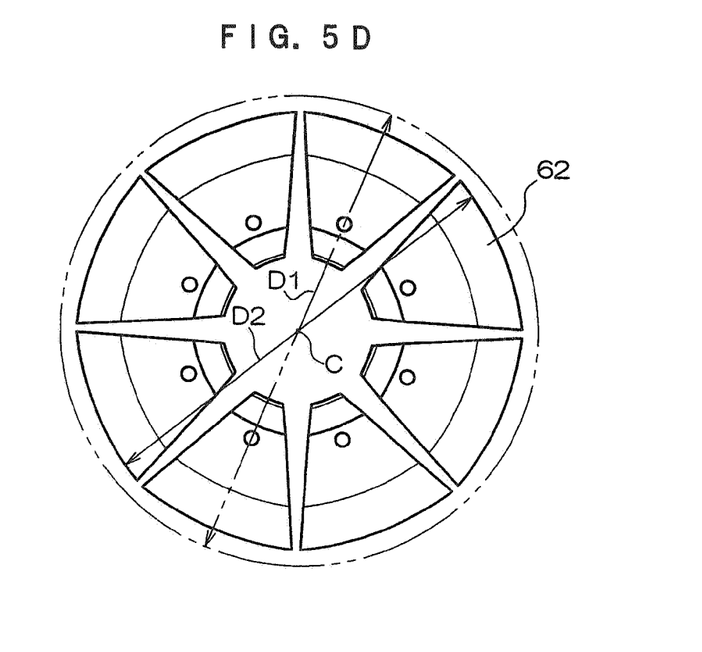
FIG. 5D is a plan view illustrating a state according to the first embodiment in which large piece portions are moved toward the central axis of the core die from the state shown in FIG. 5C.
Figures 7G, 7H:
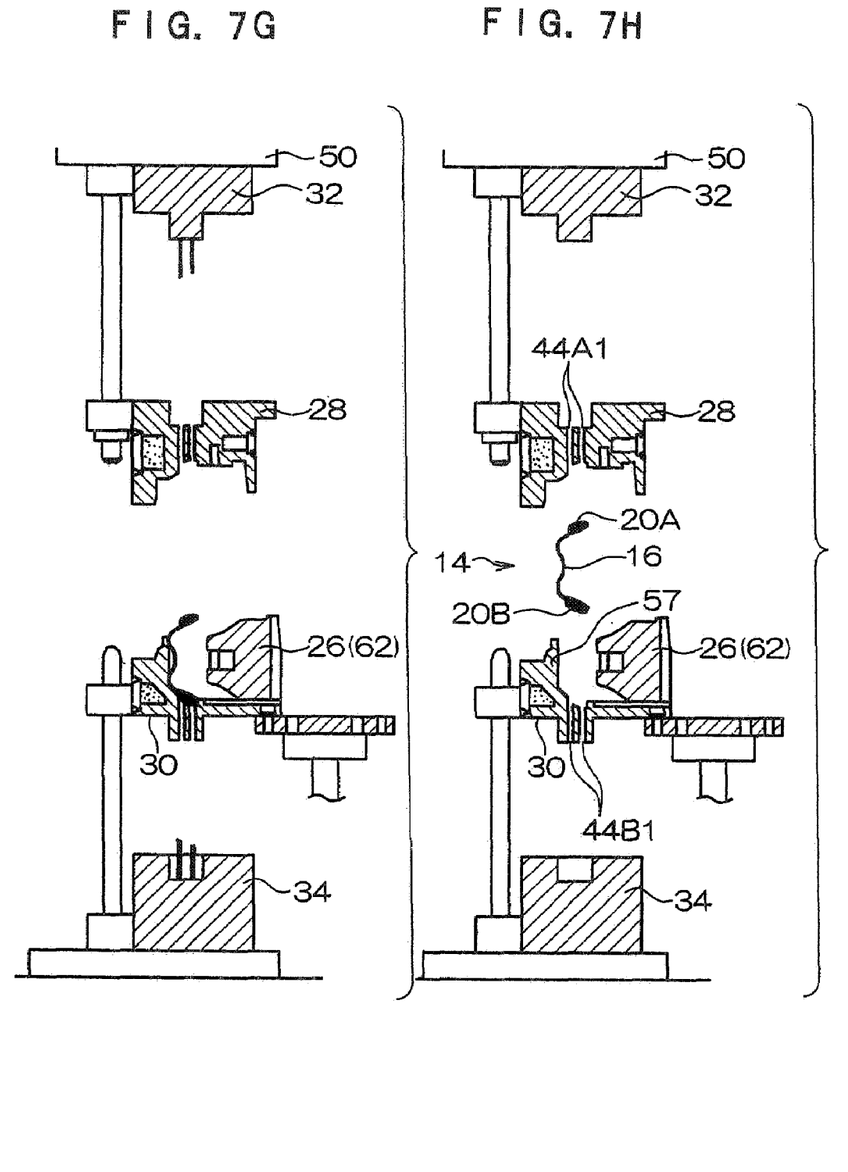
FIG. 7G is a side cross-sectional view of the procedure according to the first embodiment in which the core manufactured by the vulcanization molding is removed.
FIG. 7H is a side cross-sectional view of a procedure according to the first embodiment in which the core manufactured by the vulcanization molding is removed.

Further, by moving the large piece portions 62 toward the central axis C, the large piece portions 62 are separated from the supporting member 16 (see FIGS. 5D and 7G). As a result, the outer diameter D2 of the large piece portions 62 becomes smaller than the outer diameter D1 of the product (core 14).

Moreover, the core 14 with the rubber portions 20A and 20B joined respectively to the edge portions 18A and 18B is taken out (see FIG. 7H).

Further, the runners 44A1, 44A2, 44B1 and 44B2 are cleaned to remove the remaining rubbers. Another supporting member is set to manufacture another product.

As described above, in the present embodiment, the rubber material is transferred into the cavities simultaneously from both the upper intermediate die 28 and the lower intermediate die 30, vulcanized and molded thereafter. Accordingly, as compared to the case where the rubber material is subjected to the transfer molding and the vulcanization one by one, the cycle time (manufacturing time per one core) can be reduced by 40%. Besides, the products (cores 14) can be manufactured continuously with high accuracy. Further, since products are manufactured not by the injection molding but by the transfer molding, a rubber material extruder becomes unnecessary thus making it possible to reduce the equipment cost of the pressing machine 12.

Further, the respective runners of the upper intermediate die 28 and the lower intermediate die 30 have the same size. Accordingly, equalization of the injection amount and injection speed of rubber material from the upper intermediate die 28 and the lower intermediate die 30, and the rubber properties becomes noticeably stable.

Moreover, since the pod portions 46A1, 46A2, 46B1, and 46B2 are concaved to be open at the upper sides thereof, displacement or biting of rubber material (raw rubber) can be prevented to facilitate setting of the rubber material.

Since the jackets (heaters) 58 and 60 are provided at the upper intermediate die 28 and the lower intermediate die 30, the temperature of the upper intermediate die 28 and the lower intermediate die 30 due to radiation in the opened state thereof can be corrected for a short period. Accordingly, the quality of the rubber properties of the product manufactured by vulcanization molding can be secured, and imperfect open/close operation of the dies due to a difference between thermal expansion coefficients between the dies can be prevented.

The diameter of the core die 26 can be increased/decreased, thus facilitating setting the supporting member 16 and removal of the core 14 manufactured by vulcanization molding in a short period.

The wall surface portion 29A and the wall surface portion 29B are formed into a configuration such that a compression force in a widthwise direction is applied to the supporting member 16 in the closed state of the dies to make the width of the supporting member 16 smaller than that in the opened state of the dies. Accordingly, variation of the manufactured supporting member 16 is compensated, thereby the supporting member 16 can be securely set within the die. Further, after the vulcanization molding, the core 14 (product) can be easily peeled off from the upper intermediate die 28 and the lower intermediate die 30.

Further, a structure may be employed to provide the die with a bracing part for holding the supporting member by the core die 26, the upper intermediate 28, and the lower intermediate die 30. Accordingly, occurrences of rattling during the molding can be prevented thereby avoiding spew of rubbers and making trimming operation unnecessary. The bracing part is generally within a range of 0.1 to 0.2 mm. Further, when the upper intermediate die 28 and the lower intermediate die 30 are removed from the core die 26, the rubber material that are vulcanizingly molded inside the runners 44A1, 44A2, 44B1, and 44B2 can be adhered to the product (core 14). As a result, the time for cleaning the upper die 32 and the lower die 34 can be reduced.

Second Embodiment

A second embodiment of the present invention will be explained next. In the second embodiment, portions identical to those in the first embodiment will be denoted by the same reference numerals and a description thereof will be omitted.

The second embodiment is structured in the same manner as in the first embodiment except that a compression molding die 72 for compression-molding the rubber portions from above (see FIG. 8) is used instead of the upper intermediate die 28 and the upper die 32. The compression molding die 27 is structured of compression-molding the rubber portion 20A, together with the core die 26. In the same manner as in the upper intermediate die 28, jackets (heaters) are provided at the compression molding die 72, 50 that the temperature correction time of the dies due to radiation when the dies are opened can be reduced.

Figure 8:
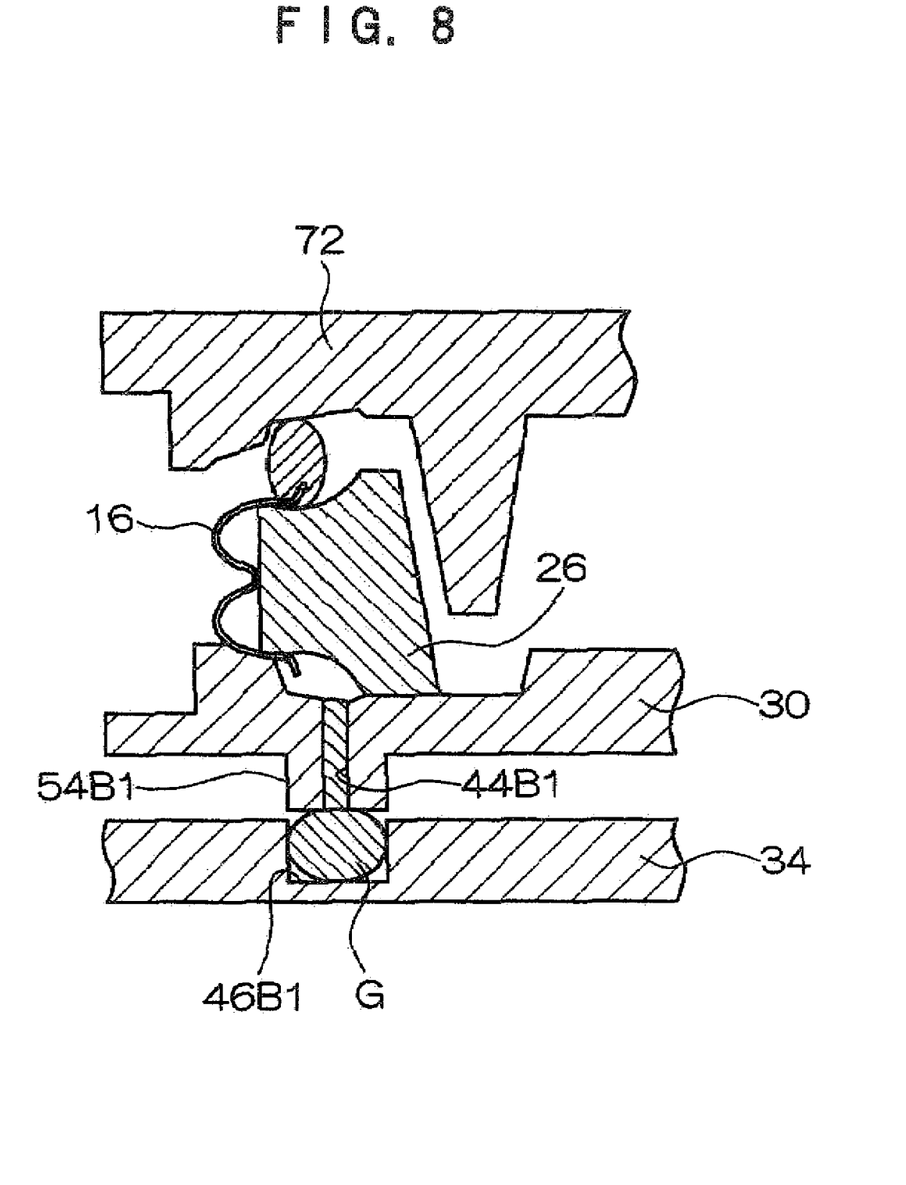
FIG. 8 is an exemplified partial side cross-sectional view according to a second embodiment in which rubber material is simultaneously molded by a compression molding from a widthwise direction one side of the supporting member and a transfer molding from a widthwise direction other side thereof.

In the present embodiment, the supporting member 16 can be set in the same manner as in the first embodiment. Further, the rubber material G for molding the rubber portions 20B are set at the pod portions 46B1 and 46B2, and the rubber material G are set at predetermined positions (positions where cavities are formed) of the core die 26. Then, the lower intermediate die 30 and the compression molding die 72 are moved downward to predetermined heights. The predetermined height of the compression molding die 72 is set so as to correspond to a location immediately before the rubber material is compressed. The predetermined height of the lower intermediate die 30 is set so as to correspond to a location immediately before the rubber material G is extruded by the convex portion 54B1 in the same manner as in the first embodiment.

By the compression molding die 72 and the lower intermediate die 30 being moved downward, at the same time when the rubber material G is compressed by the compression molding die 72, the rubber material G is transferred, through the runners 44B1 and 44B2 of the lower intermediate die 30, into the cavities. In this state, the rubber material is vulcanized and molded for a predetermined period of time and at a predetermined temperature.

Thereafter, in the same manner as in the first embodiment, the core is taken out.

Further, the respective runners are cleaned to remove the remaining rubbers, the supporting member is newly set to manufacture another product.

As described above, in the present embodiment, the rubber portions are molded and vulcanized at the same time by being compression-molded at the widthwise direction one side (upper side) of the supporting member 16, and by being transfer-molded at the widthwise direction other side (lower side) thereof. By this arrangement, as compared to the case where the rubber portions are injection-molded and vulcanized from both widthwise direction sides of the supporting member or the case where the rubber portions are transfer molded from both sides thereof, the amount in which materials for structuring the runners can be reduced by half, and the number of cleaning steps of a die or that of finishing steps of products can be reduced by half.

Since the compression molding die 72 is provided for compressing rubber material from above, presetting of the rubber material for compression molding becomes unnecessary, whereby a core manufacturing time can be reduced to a great deal.

Since the rubber material G is transferred in the state in which the core die 26 and the supporting member 16 are fixed with the compression molding die 72 and the lower intermediate die 30, even if the rubber material G is transferred only from the one widthwise edge portion of the supporting member 16, a predetermined product size can be easily obtained.

While preferred embodiments of the invention have been described, such description is for illustrative purposes only, and it is to be understood that changes and variations may be made without departing from the spirit or scope of the invention. Further, it is needless to say that the scope of the invention is not limited to the above-described embodiments.

INDUSTRIAL APPLICABILITY

As described above, the die and method for manufacturing a core according to the present invention are suitable when the rubber material is simultaneously transferred from the runners both of the first and second transfer-molding dies, and vulcanized and molded. Accordingly, the present invention is preferably used as a die and a method for manufacturing a core which are capable of manufacturing cores continuously with high accuracy and with high productivity by using simple and low-cost equipment.

DESCRIPTION OF REFERENCE NUMERALS

10: PNEUMATIC TIRE
12: PRESSING MACHINE (DIE FOR MANUFACTURING A CORE)
14: CORE
16: SUPPORTING MEMBER
18A and 18B: EDGE PORTIONS
20A and 20B: RUBBER PORTIONS
24: TREAD PORTION
28: UPPER INTERMEDIATE DIE (FIRST TRANSFER MOLDING DIE)
30: LOWER INTERMEDIATE DIE (SECOND TRANSFER MOLDING DIE, TRANSFER MOLDING DIE)

42A, 42B: CAVITIES
44A1, A2, B1, B2: RUNNERS
46A1, A2, B1, B2: POD PORTIONS
54A1, A2, B1, B2: CONVEX PORTIONS
58: JACKETS (HEAT SOURCE)
60: JACKETS (HEAT SOURCE)
72: COMPRESSION MOLDING DIE

The invention claimed is:

1. A die for manufacturing a core including: a ring-shaped supporting member that is formed by a plate-like member, that is disposed inside a pneumatic tire, and that supports the pneumatic tire by allowing an inner side of a tire tread portion to be brought into contact with an outer peripheral surface of the supporting member at the time of a deformation of the pneumatic tire due to a decrease of an internal pressure of the tire; and ring-shaped rubber portions that are respectively joined to both widthwise direction edge portions of the supporting member, the die comprising:

a ring-shaped core die that is brought into contact with the supporting member from radial inner side directions thereof to support the supporting member while maintaining a non-contact state with the both widthwise direction edge portions of the supporting member;

first and second transfer-molding dies that are disposed so as to hold the core die therebetween from the core die axial direction and form cavities between the first transfer-molding die and the core die as well as between the second transfer-molding die and the core die, the cavities being used for forming the rubber portions respectively at one edge portion and the other edge portion of the supporting member; and a transfer part that injects a rubber material into runners that are respectively formed at the first and second transfer-molding dies and simultaneously transfers the rubber material into the cavities, wherein the rubber material injected into the cavities is vulcanized and molded.

2. The die for manufacturing a core according to claim 1, wherein the dimensions of the respective runners of the first and second transfer-molding dies are the same.

3. The die for manufacturing a core according to claim 1, wherein a heat source is provided at the first and at the second transfer-molding dies.

4. The die for manufacturing a core according to claim 1, wherein the diameter of the core die can be increased and decreased.

5. A die for manufacturing a core including a ring-shaped supporting member that is formed by a plate-like member, that is disposed inside a pneumatic tire, and that supports the pneumatic tire by allowing an inner side of a tire tread portion to be brought into contact with an outer peripheral surface of the supporting member at the time of a deformation of the pneumatic tire due to a decrease of an internal pressure of the tire; and ring-shaped rubber portions that are respectively joined to both widthwise direction edge portions of the supporting member, the die comprising:

a ring-shaped core die that is brought into contact with the supporting member from radial inner side directions thereof to support the supporting member while maintaining a non-contact state with the both widthwise direction edge portions of the supporting member;

a transfer-molding die and a compression-molding die that are disposed so as to hold the core die therebetween from the core die axial direction, and that form cavities between the transfer-molding die and the core die as well as between the compression-molding die and the core die, the cavities being used for forming the rubber portions respectively at one edge portion and at the other edge portion of the supporting member;

a transfer part that, at the same time when rubber material is compressed by the compression molding die, causes the rubber material to be injected into runners formed at the transfer-molding die and transferred into the cavities, wherein the rubber material injected into the cavities are vulcanized and molded.

6. The die for manufacturing a core according to claim 5, wherein a heat source is provided at the transfer-molding die and at the compression-molding die.

* * * * *